United States Patent

Haas et al.

Patent Number: 5,954,514
Date of Patent: Sep. 21, 1999

[54] TALKING ALBUM FOR PHOTOGRAPHIC PRINTS

[75] Inventors: Kenneth M. Haas, Oakfield; David R. Dowe, Holley; Dale F. McIntyre, Honeoye Falls; Laura R. Whitby, Rochester, all of N.Y.

[73] Assignee: Eastman Kodak Company, Rochester, N.Y.

[21] Appl. No.: 08/911,162

[22] Filed: Aug. 14, 1997

[51] Int. Cl.⁶ ..................................................... G09B 5/00
[52] U.S. Cl. .......................... 434/317; 434/308; 434/330; 434/409
[58] Field of Search .............................. 434/73, 134, 168, 434/190, 301, 308, 309, 311, 315, 316, 317, 330, 409

[56] References Cited

U.S. PATENT DOCUMENTS

| | | |
|---|---|---|
| 1,558,376 | 10/1925 | Lewis et al. . |
| 4,434,567 | 3/1984 | LeVeau . |
| 4,636,881 | 1/1987 | Brefka et al. . |
| 4,990,092 | 2/1991 | Cummings . |
| 4,993,750 | 2/1991 | Hoffmeister et al. . |
| 5,063,698 | 11/1991 | Johnson et al. ...................... 40/124.03 |
| 5,167,508 | 12/1992 | McTaggart . |
| 5,186,496 | 2/1993 | Seki . |
| 5,277,452 | 1/1994 | Skidmore . |
| 5,290,190 | 3/1994 | McClanahan . |
| 5,374,195 | 12/1994 | McClanahan . |
| 5,520,544 | 5/1996 | Manico et al. . |
| 5,555,977 | 9/1996 | Oshry et al. . |

*Primary Examiner*—Glenn E. Richman
*Attorney, Agent, or Firm*—Gordon M. Stewart

[57] ABSTRACT

An album (50) for photographic prints includes a front cover (52); a back cover (54); a binder member (56) attached between the front and back covers; an elongated, partially cylindrical shell member (78) attached to the binder member, the shell member having opposite ends (80, 82) and opposed longitudinal edges (90, 92), the longitudinal edges being attached to the binder member; and at least one album page (94) movably attached to the shell member, the page having opposed portions (96, 98) which extend around the opposite ends, whereby the page can be moved circumferentially around the shell member from a first position near one of the covers to a second position near another of the covers. The album may include a sensing device (30, 32) to detect movement of the at least one page and a produce a signal; and a system (124–160), responsive to the signal, for playing back sound messages or displaying text messages, or both, associated with photographic prints carried by the at least one page.

26 Claims, 9 Drawing Sheets

TALKING ALBUM FOR PHOTOGRAPHIC PRINTS

CROSS REFERENCE TO RELATED APPLICATIONS

Commonly assigned, allowed U.S. Ser. No. 08/625,565, filed on Mar. 28, 1996, U.S. Pat. No. 5,707,565 discloses a talking album for photographic prints. The album includes a magnet on each album page and Hall effect sensors for determining page position. The disclosure of this application is hereby incorporated by reference into the present specification.

FIELD OF THE INVENTION

The invention concerns talking albums for photographic prints. More particularly, the invention concerns improvements to such albums to simplify attachment and removal of pages, to allow a user to hear or see a message about the content of the album without removing the album from a shelf, and to provide ready access to batteries.

BACKGROUND OF THE INVENTION

Figure 1:
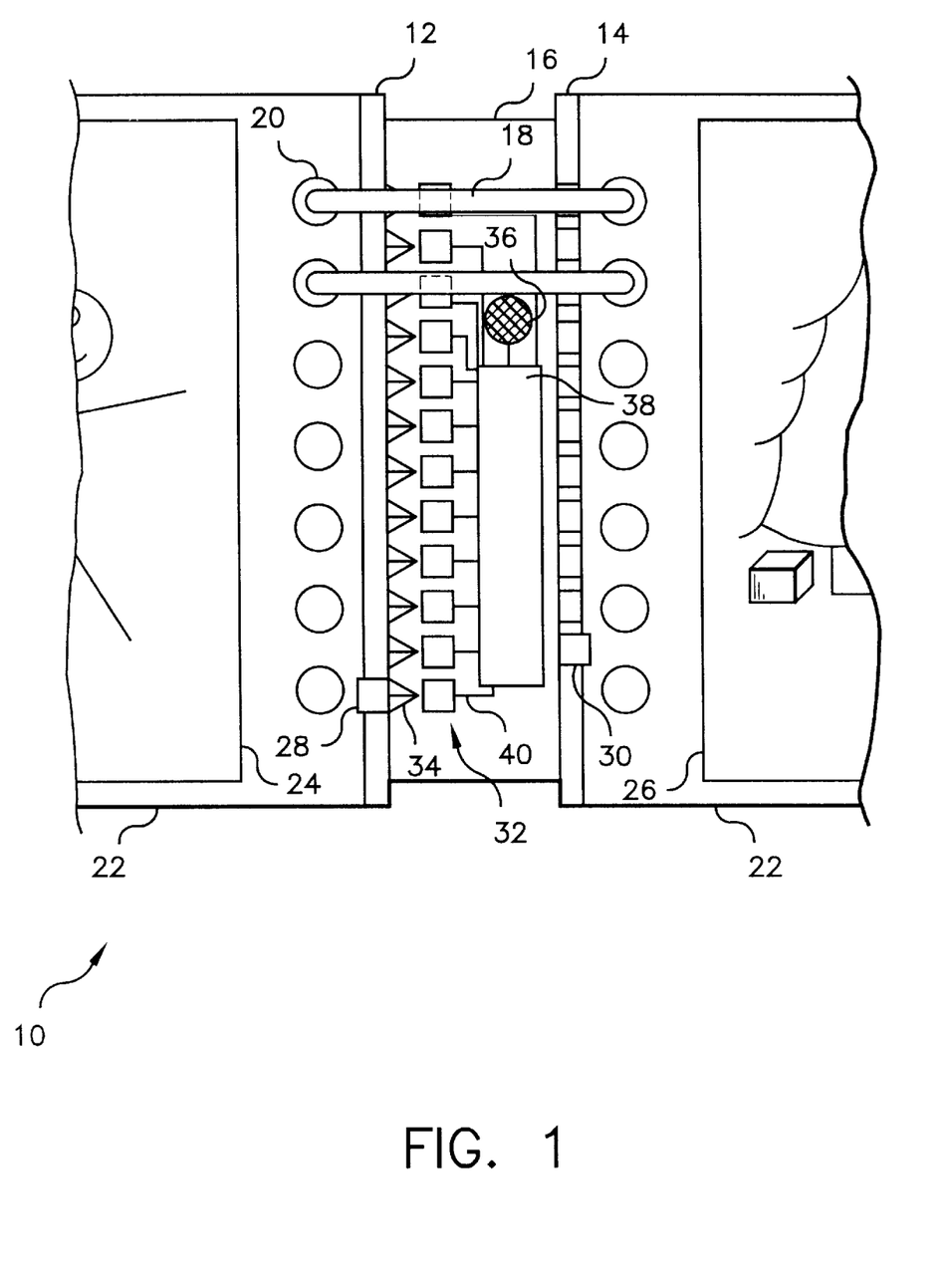
FIG. 1 shows a fragmentary plan view of an open talking album for photographic prints, of a disclosed in the cross-referenced application.
Figure 2:
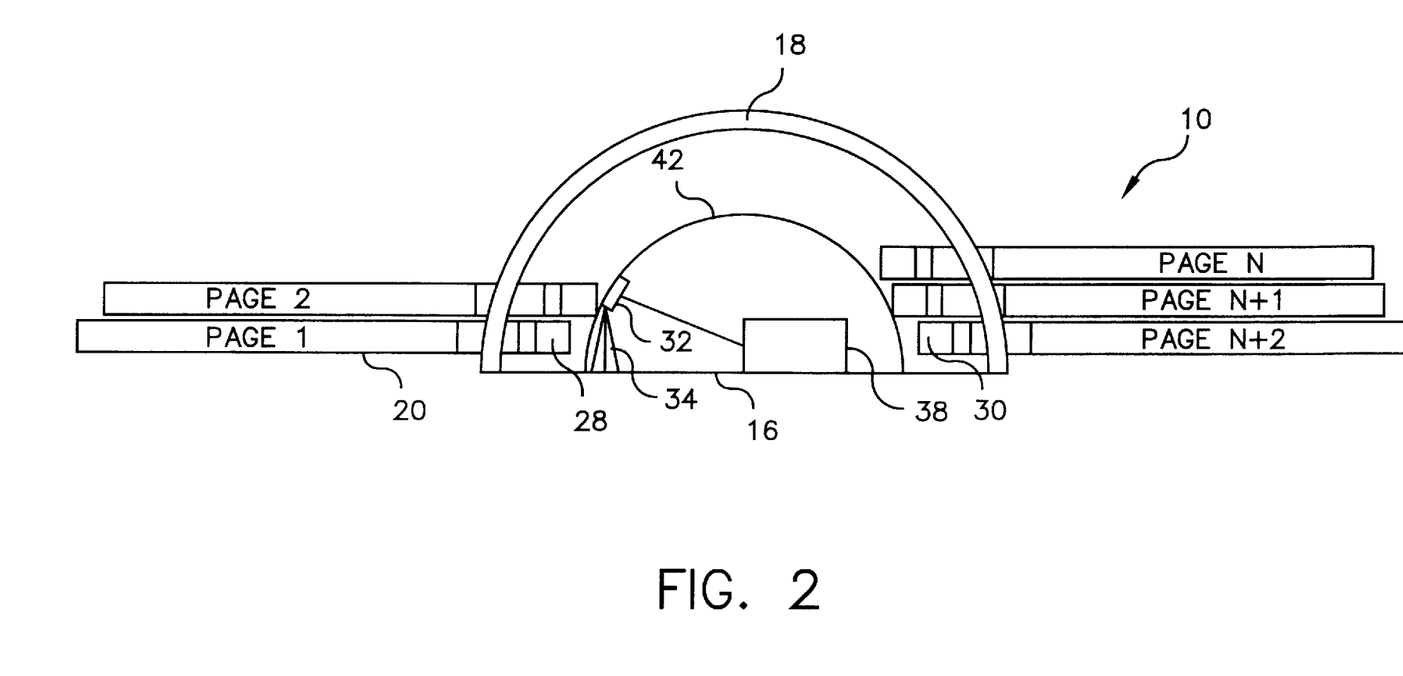
FIG. 2 shows an end view of the talking album of FIG. 1.
Figure 3:
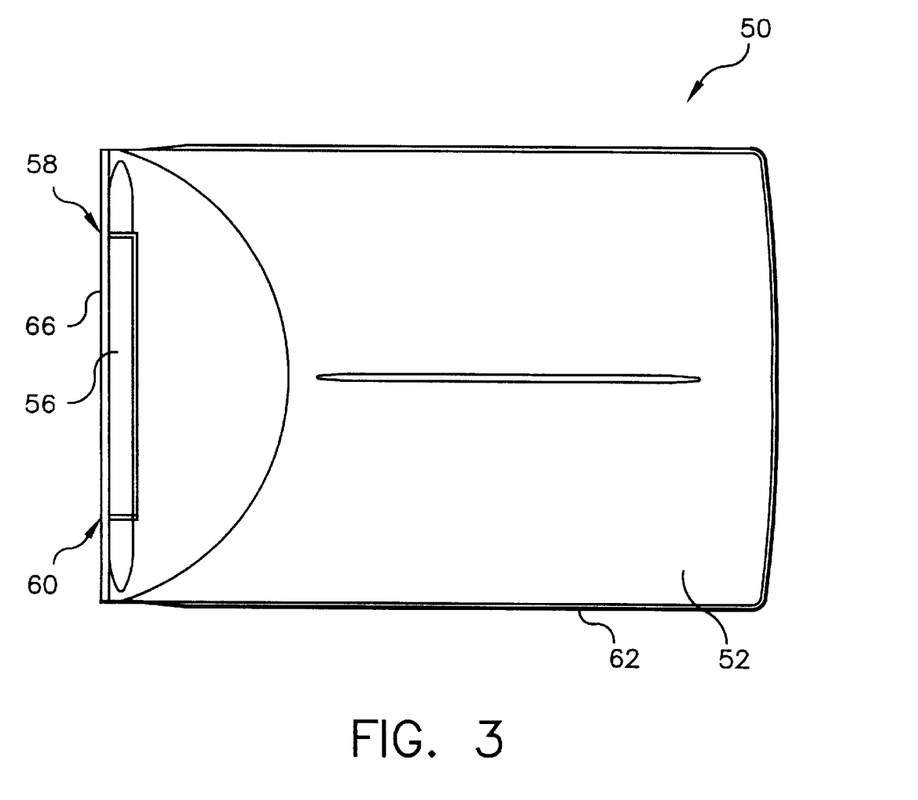
FIG. 3 shows a plan view of the front cover of a talking album in accordance with the present invention, the back cover being substantially identical.
Figure 4:
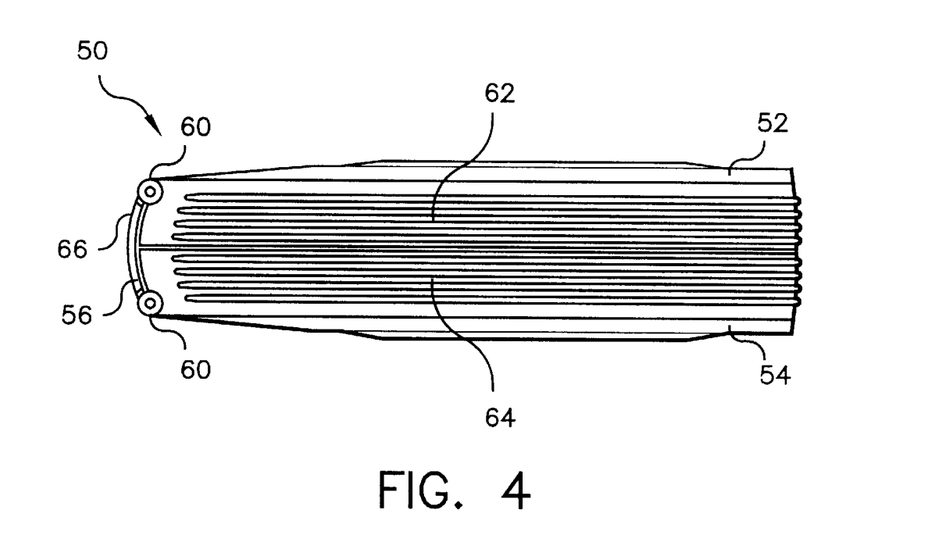
FIG. 4 shows a view of the bottom end of the talking album of FIG. 3, the view of the top end being substantially identical.
Figure 5:
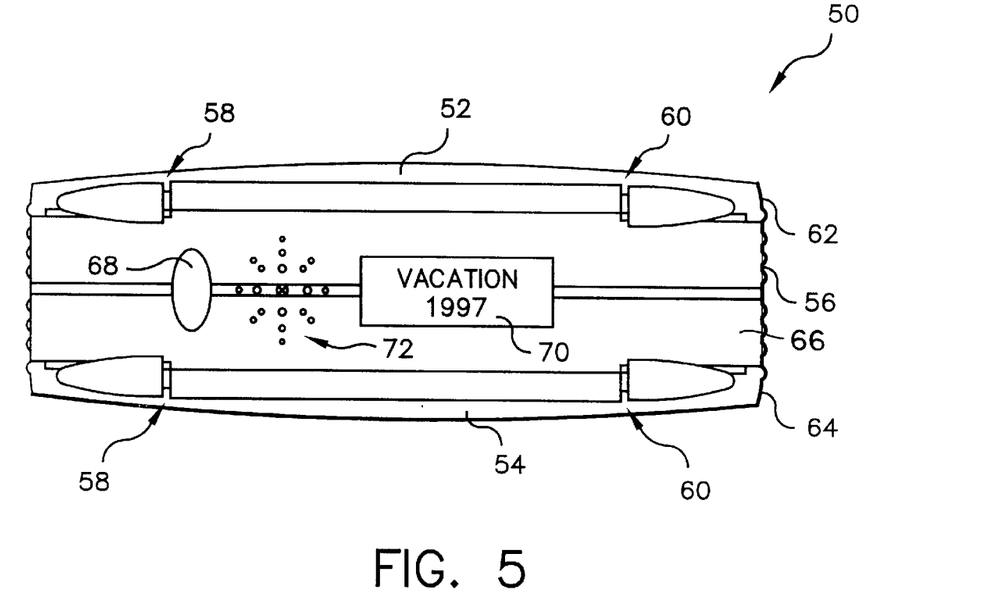
FIG. 5 shows a view of the spine end of the talking album, taken from the left of FIG. 3.

As shown in FIGS. 1 and 2 of the present specification, the cross-referenced application discloses a talking album 10 for photographic prints. A front cover 12 and a back cover 14 are hinged to a central binder or spine member 16 in the familiar manner. A plurality of binder rings 18 are provided to extend through holes 20 in album pages 22. Photographs 24, 26 are mounted on front and back surfaces of the album pages. Near the binder rings, the album pages bear spaced permanent magnets 28, 30. As the pages are turned, these magnets interact sequentially with an array of Hall effect sensors 32 mounted on binder member 16 by supports 34. As each page is turned, a speaker 36 emits a prerecorded sound message about the subjects displayed on the album pages. The sound message may include voice, music, or other sounds as desired. A controller 38 is connected to speaker 36 and, via wires 40, to sensors 32. An elongated, partially cylindrical shell member is formed from an opaque plastic semi-cylinder 42. The shell member protects sensors 32, controller 38 and speaker 36 from damage and also enhances the appearance of the open album by hiding these components from view.

While the talking album of FIGS. 1 and 2 has many positive attributes, needs for improvement have been identified. The binder rings contribute considerably to the bulk and complexity of the album; so, a simpler manner of mounting the album pages would be desirable. When the album is shelved for storage, its contents can be indicated by a label applied to the outside surface of the spine member; however, such labels tend to fall off and can become outdated when the contents of the album are changed. Of course, the album can simply be removed from the shelf and opened to determine its contents, at some inconvenience to the user. It would be desirable for the album to have a feature enabling a user to activate a voice message or text message regarding the contents of the album, without having to remove the album from the shelf.

SUMMARY OF THE INVENTION

An album in accordance with the invention is particularly suited for photographic prints. As such, the album may include a front cover; a back cover; and a binder member attached between the front and back covers. The front and back covers may be hinged to the binder member. In one embodiment, an elongated, partially cylindrical shell member is attached to the binder member, the shell member having opposite ends and opposed longitudinal edges, the longitudinal edges being attached to the binder member. The shell member may be made up of a plurality of sections which are axially aligned between the opposite ends. Uniquely in accordance with the invention, at least one album page is movably attached to the shell member, the album page having opposed portions which extend around the opposite ends of the shell member. As a result, the album page can be moved circumferentially around shell member from a first position near one of the covers to a second position near the other of the covers.

An album in accordance with the invention also may include a sensing device to detect movement of the album page and to produce a signal; and a system, responsive to the signal, for playing back sound messages associated with photographic prints carried by the at least one page. The system may also record the sound messages. An interior volume may be defined between the shell member and the binder member; and the sensing device may include a magnet carried on the album page and a magnetic sensor located within the interior volume to detect movement of the album page and to produce the signal.

In accordance with another embodiment of the invention, without regard to how the album pages are attached to the binder, the binder member may include an external surface which is accessible when the album is closed and shelved like a book. In this embodiment, the system comprises a first speaker supported by the binder member for playing back sound messages through the external surface when the album is closed; and a switch is supported by the binder member and accessible at the external surface for activating the system to play back a sound message when the album is shelved like a book. The album further may include a second speaker supported by one of the covers for playing back sound messages when the album is open.

The album may include a pair of end caps installed at respective opposite ends of the shell member. The end caps may be relieved to guide movement of the opposed portions of the at least one page. The system may include at least one battery installed in the interior volume near one of the opposite ends; and an end cap may be removably installed in the one opposite end for providing access to the battery. The shell member may include at one end an open-ended slot through which one of the opposed portions can be inserted; and a latch member may be slidably mounted in the slot for blocking the slot to prevent removal of the one opposed portion through the slot. The opposed portions may be hooks having ends which are inserted into the interior volume. The hooks may be flexible to permit their being flexed past the opposite ends into the interior volume.

An album in accordance with yet another embodiment of the invention may include a sensing device to detect movement of the album page and to produce a signal; and a system, responsive to the signal, for displaying text messages associated with photographic prints carried by the album page. The system also may record the text message. The binder member may include an external surface which is accessible when the album is closed and shelved like a book; the system may include a display supported by the binder member for displaying text messages at the external surface when the album is closed; and a switch may be supported by the binder member and accessible at the external surface for activating the system to display a text message when the album is shelved like a book.

The invention provides various advantages. The mounting of the album pages is simplified and the album pages are guided during movement from one side of the album to the other. The shell member now performs dual functions of protecting at least portions of the circuitry and mounting the album pages. A removable end cap on the shell member provides ready access to batteries for the sound or text message system of the album. The contents of an album can be determined even when the album is shelved like a book, simply by pressing a switch on the spine of the album to activate the sound or text message system. The controller of the album switches between its external and internal speakers when the album is opened and closed, thereby conserving power and maintaining audio quality.

DETAILED DESCRIPTION OF THE INVENTION

FIGS. 3 to 12 show various mechanical features of an album 50 in accordance with the present invention. A hard shell front cover 52 and a hard shell back cover 54 are pivotably attached to a central binder or spine member 56, by means of pairs of hinges 58, 60. Although conventional mechanical hinges are preferred for robustness, those skilled in the art will appreciate that so-called living hinges could be used. The covers and binder member conveniently may be molded from impact resistant plastic. Front cover 52 comprises an integral peripheral wall 62 which extends along the three sides of the cover which are not joined to spine member 56. A mirror image peripheral wall 64 is formed integrally with back cover 54. Thus, when the album is closed as in FIGS. 3 to 6, the peripheral walls and the spine member effectively shield the contents from incidental damage.

Figure 6:
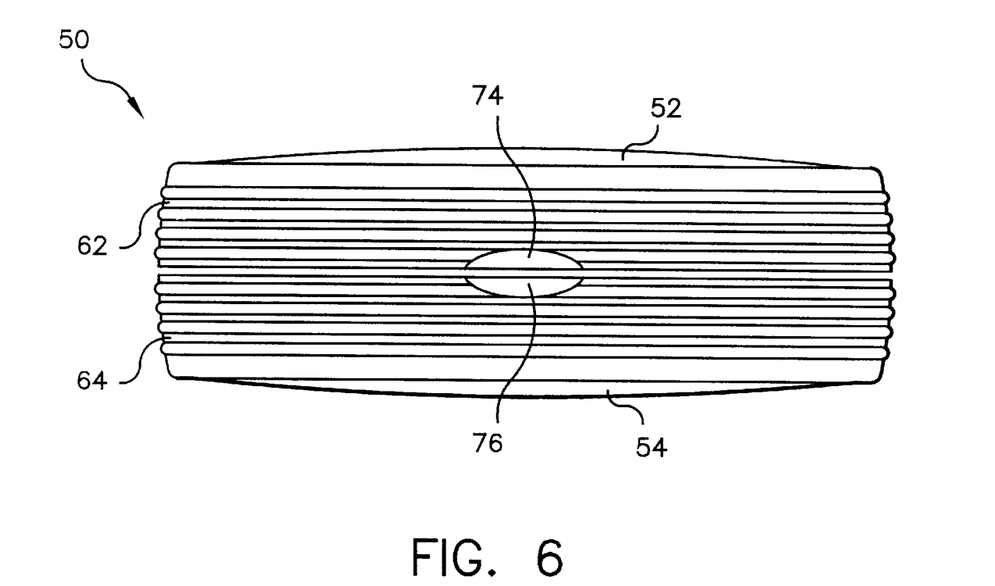
FIG. 6 shows a view of the openable end of the talking album, taken from the right of FIGS. 3 and 4.

On an external surface 66 of spine member 56 are located a switch 68, a text display panel 70 such as a liquid crystal display, and a speaker grille 72 for an externally directed speaker to be described later in this specification. When the album is shelved like a book, switch 68 can be pressed to activate an internal voice message or text message system to produce a message on display 70 or through grille 72, as will be described later. As shown in FIG. 6, peripheral walls 62, 64 are provided with recesses 74, 76 which a user of the album can engage with his or her fingers or thumbs to open the album to the configurations of FIGS. 7 and 8.

Figures 7, 11, 12:
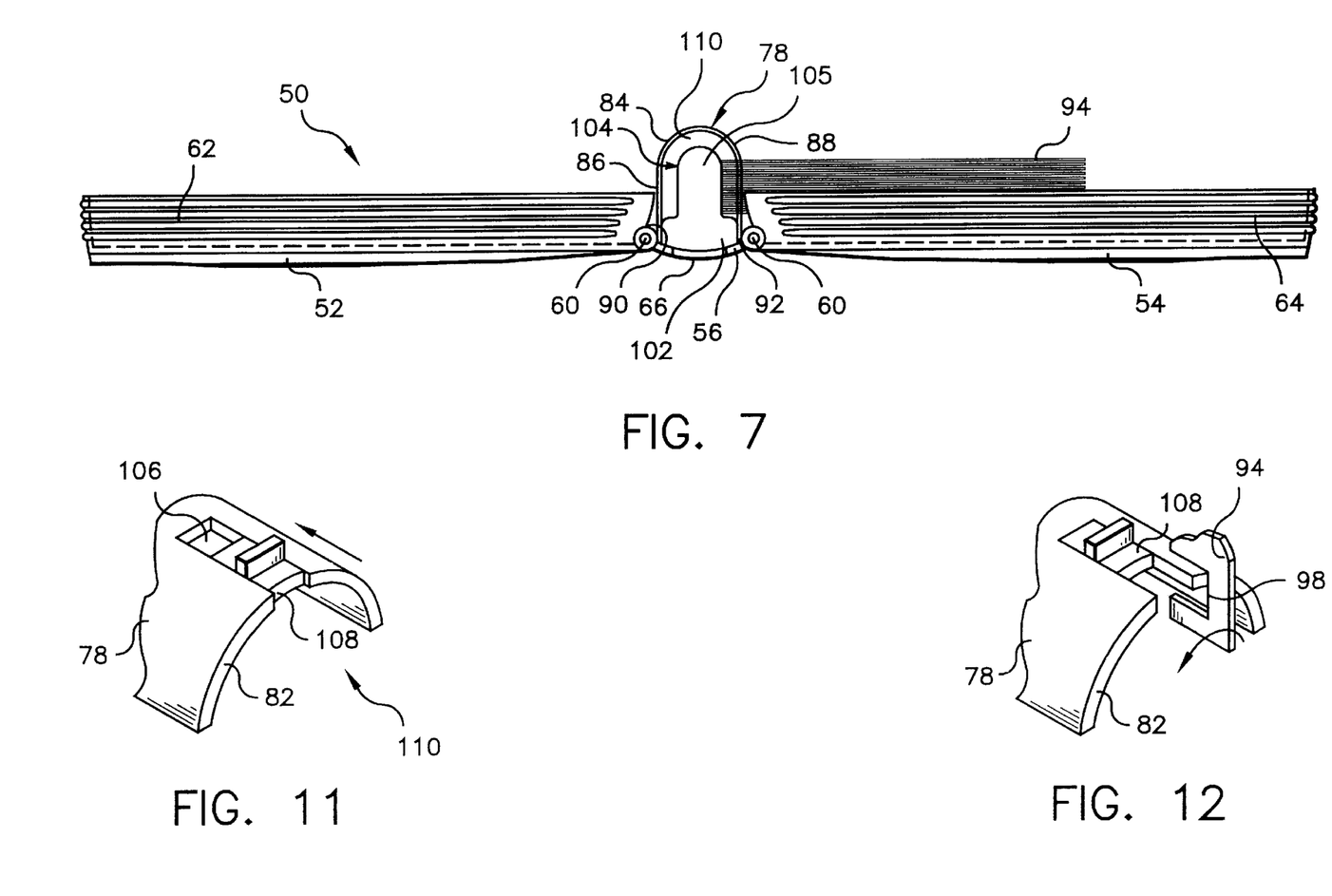
FIG. 7 shows a view of the bottom end of the talking album of FIG. 4, after the album has been completely opened.
FIG. 11 shows a fragmentary perspective view of a latching mechanism for holding album pages in attachment to the binder, with the latch in its closed position.
FIG. 12 shows a fragmentary perspective view of the latch of FIG. 11 in its open position, with a fragmentary album page about to be installed on the binder.
Figure 8:
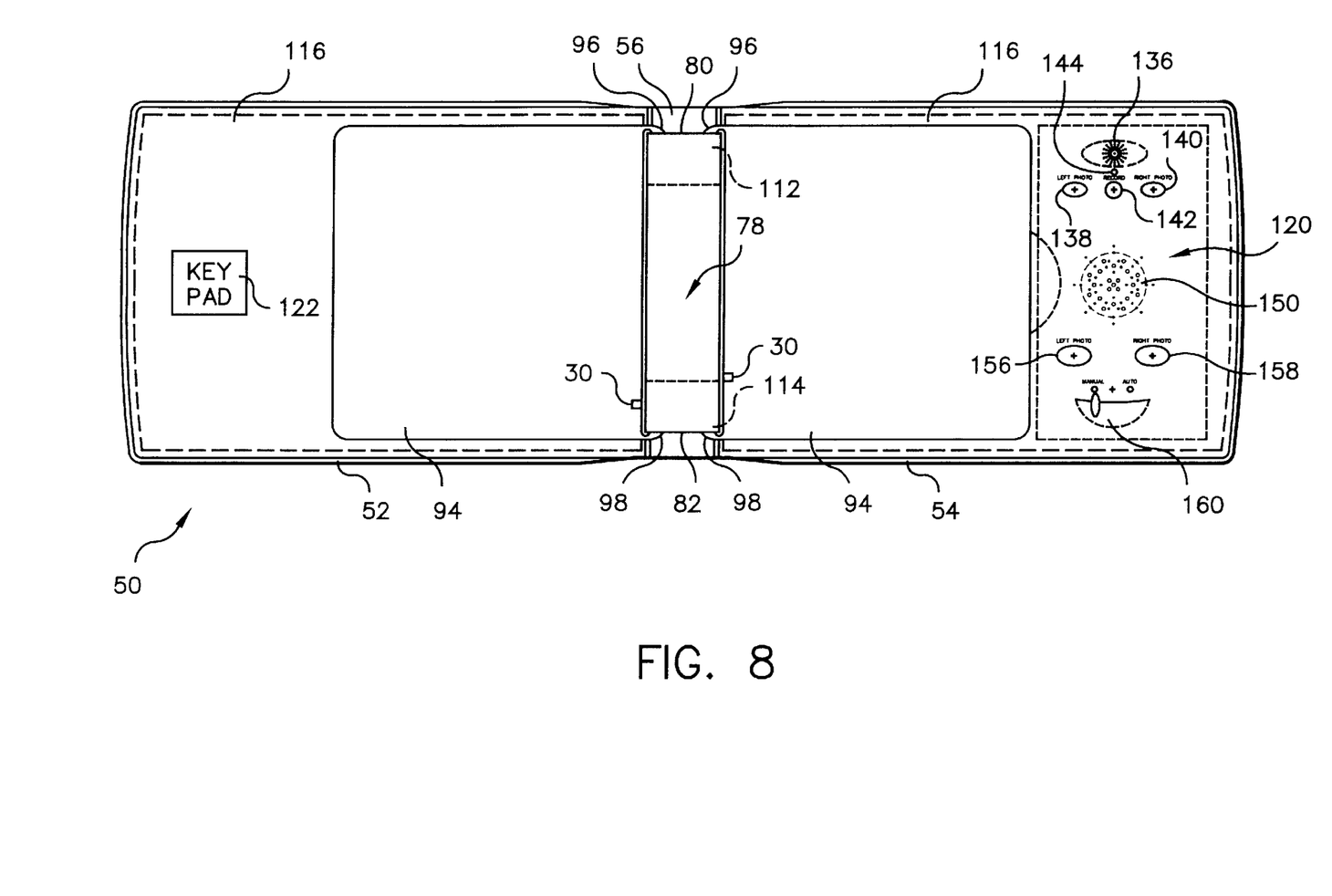
FIG. 8 shows a plan view of the opened talking album of FIG. 7.
Figure 9:
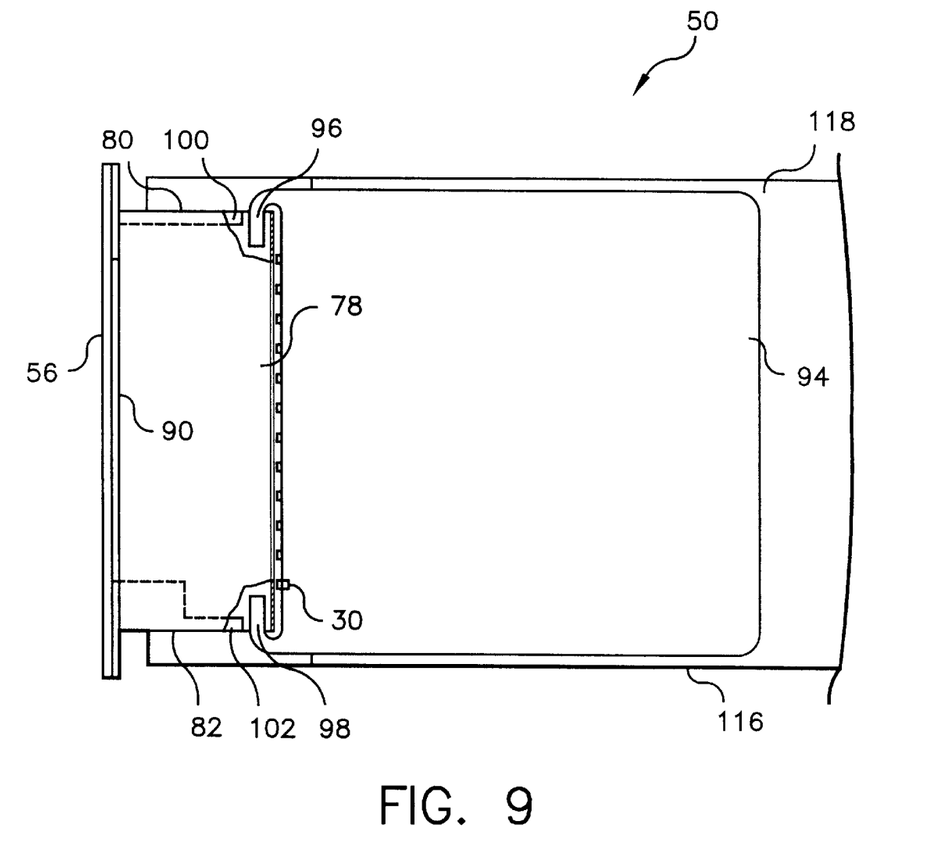
FIG. 9 shows an enlarged, partially broken away plan view of the talking album of FIG. 7, indicating how the pages of the album are attached to the binder and supported by an insert panel of the album.

As shown in FIGS. 7 to 10, an elongated, partially cylindrical shell member 78 is attached to binder member 56. Shell member 78 may be made from a rigid, opaque plastic. The shell member has opposite, open ends 80, 82; a semi-cylindrical outer portion 84; and depending opposing, essentially straight walls 86, 88. The walls have longitudinal edges 90, 92 which are attached to the binder member in any convenient manner such as with adhesive, snap fittings, or the like, not shown. A plurality of album pages 94 are movably attached to shell member 78. As shown in FIG. 9, each album page is provided at one edge with opposed, hook-like portions 96, 98 which extend around opposite ends 80, 82 to attach the pages to the shell member. Thus, the album pages can be moved circumferentially along the shell member from a position near one of covers 52, 54 to a position near the other cover. Hook-like portions 96, 98 may be made from a flexible plastic material to facilitate their being flexed past opposite ends 80, 82 into an interior volume 110 of shell member 78. A pair of end caps 100, 102 are snap-fitted into the open ends of shell member 78. End caps 100, 102 are provide with reliefs 104 to separate a central portion 105 of the end caps from the shell member. Thus, hook-like portions 96, 98 extend between the shell member and the end caps; so that, the pages are guided during movement from one side of the album to the other. Reliefs 104 also enable a user to easily grasp central portion 105 during removal or installation of the end caps.

As shown in FIGS. 11 and 12, shell member 78 may be provided with features for securing pages 94 against inadvertent removal. In this instance, hook-like portions 96, 98 preferably would be made from a stiff material. An open-ended slot 106 is provided at least at one of opposite ends 80, 82 and a slidable latch member 108 is mounted for movement along slot 106. To attach a page to the shell member, latch member 108 first is moved from the position of FIG. 11 to the position of FIG. 12. Hook-like portion 96 is slipped into interior volume 110 at end 80 and hook-like portion 98 is slipped through open-ended slot 106 into the interior volume. Latch member 108 is then moved back to the position of FIG. 11 to complete the attachment. To remove album pages, the process is reversed. Although hook-like portions are preferred due to their ease of attachment, those skilled in the art will appreciate that shell member 78 could be hinged along one of edges 90, 92, not shown. In that instance, page 94 could be provided with a continuous slot, also not shown, through which the shell member could be passed to attach or detach an album page. Although a continuous shell member provides a pleasing appearance and optimum protection for components mounted within, the shell member could be made up of a plurality of spaced sections, such as end sections 112, 114 indicated by dashed lines in FIG. 8.

Figure 10:
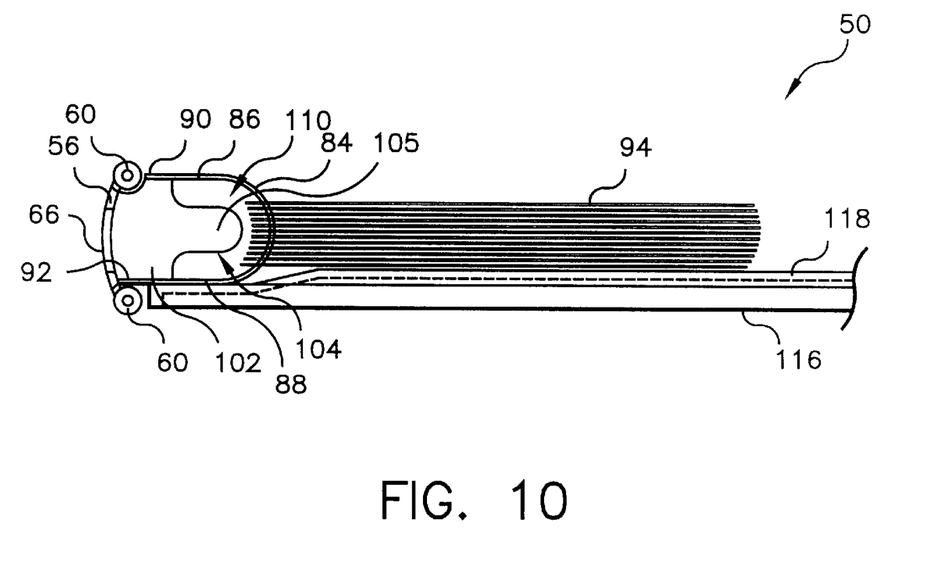
FIG. 10 shown a view of the bottom end of the talking album of FIG. 9.

As shown in FIGS. 8 to 10, an insert panel 116 is nested within each of covers 52, 54 to provide support for the album pages and convenient spaces for components of the voice and text message systems. Panel 116 may include a raised portion 118 to support the album pages in the position of FIG. 7 when both covers and the spine member are laid flat. Raised portion also supports the album pages in the position of FIGS. 9 and 10 which is assumed when the album is closed. Note in FIG. 10 that when the album is closed, shell member 78 fits between spine member 56 and raised portion 118.

Figure 13:
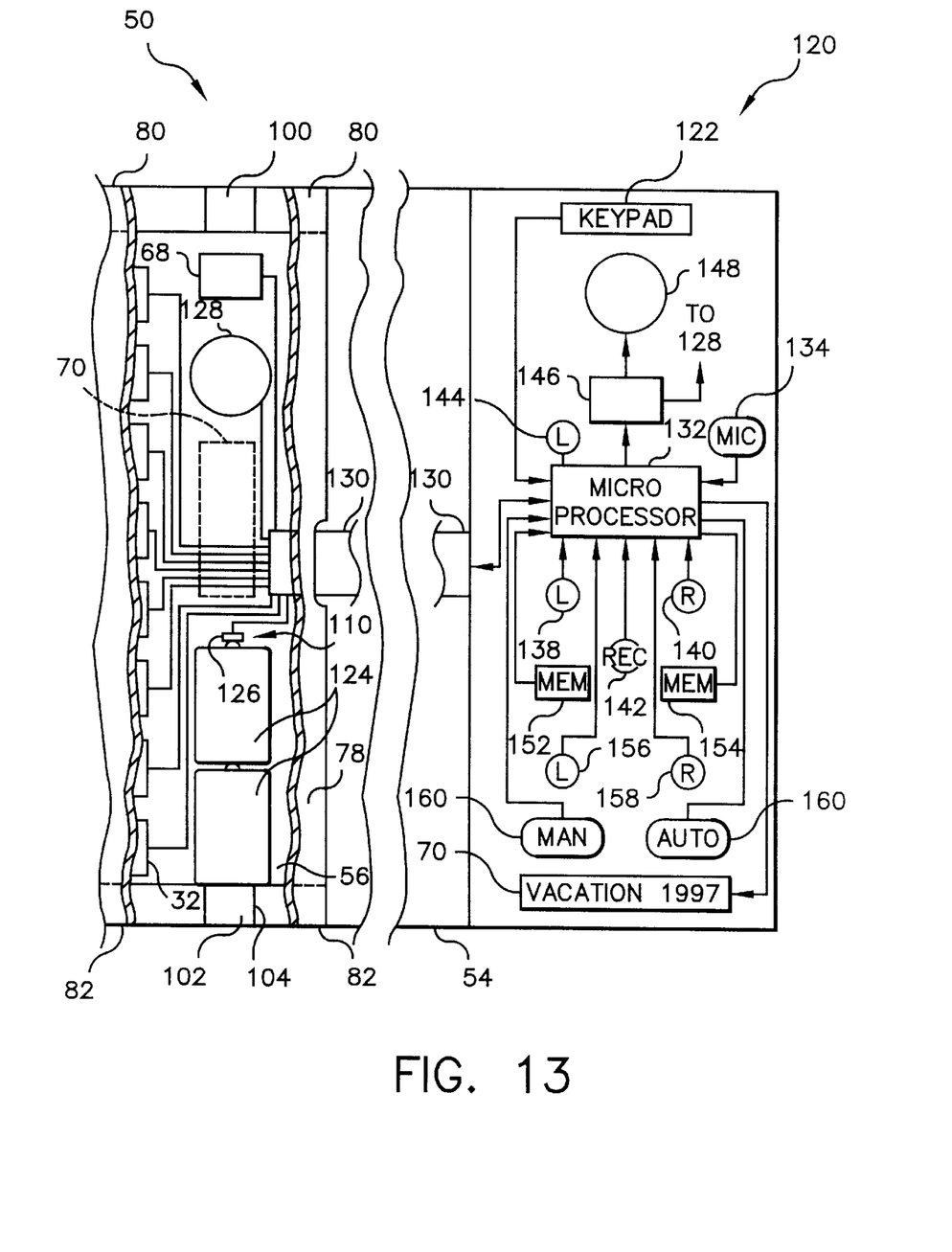
FIG. 13 shows a partially broken away, partially schematic view of the binder and back cover of the talking album, indicating the location of various components of the record and play back system.

As shown in FIGS. 8 and 13, back cover 54 supports insert panel 116 on which a user interface or control panel 120 is provided for operating a system for recording and playing back of voice messages. Similarly, front cover 52 supports an insert panel on which a key pad 122 is provided for operating a system for entering and displaying text messages. Those skilled in the art will appreciate, however, that the user interface features may be collected on a single panel or divided between two or more panels, in any convenient manner, without departing from the scope of our invention.

Within interior volume 110, a plurality of batteries 124 are mounted in the familiar manner, with a positive terminal of one battery engaging a conventional electrical contact 126. End cap 102 may be provided with a further electrical contact in the form of a conventional compression spring, not shown. An external speaker 128 is supported on spine member 56 opposite grille 72. A flexible cable 130 extends through an opening in shell member 78 and passes beneath control panel 120 to a location where the cable is connected to a controller including a microprocessor 132. Inputs from sensors 32, switch 68, key pad 122, and batteries 124 are directed to the microprocessor. A microphone 134 is located behind a grille 136 in panel 120 and also provides an input to a storage device 146 to be described shortly. A left photo record switch 138 and a right photo record switch 140 are provided to enable a user to indicate to the microprocessor the photograph for which a message is to be entered. A record switch 142 is provided to enable a user to instruct the microprocessor to activate microphone 134 and start recording. Recording in process may be indicated by a "record on" lamp 144. A semiconductor digital/analog storage device 146, such as the ISD2500 produced by Information Storage Device, Inc. of San Jose, Calif., is provided to convert stored sound messages for playback through an internal speaker 148 set behind a grille 150 in control panel 120. Those skilled in the art will appreciate that other playback techniques may be used without departing from the scope of the invention, such as a digital to analog converter with an amplifier to drive speaker 148. Sound messages received using microphone 134 may be stored in a sound message memory 152 or on device 146. Text messages entered using key pad 122 are stored digitally in a text message memory 154. Text messages may be for display on display 70 on the exterior of the album or on an internal display, not shown, within the album. An data port, not illustrated, also could be provided for downloading sound and text messages from an external source, such as a personal computer or digital camera.

A left photo play back switch 156 and right photo play back switch 158 are provided to enable the user, in a manual mode of operation, to indicate to the microprocessor the photograph for which a message is to be played back or displayed. A manual/automatic switch 160 is provided to enable the user to select a manual or automatic mode of playback or display of messages. Key pad 122 would include a key or switch, not shown, for indicating to the microprocessor that a text message is to be recorded or displayed.

Figure 14:
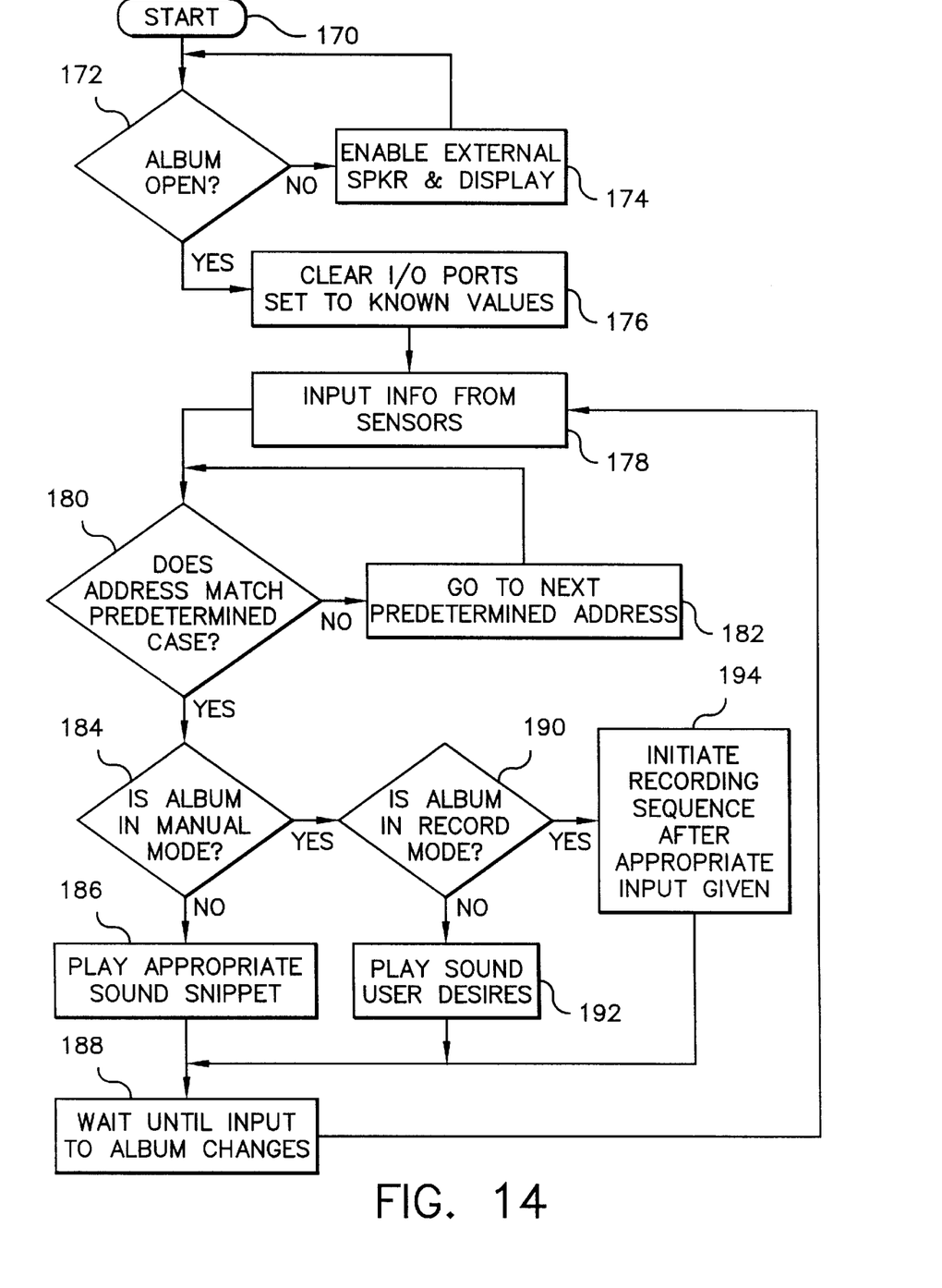
FIG. 14 shows a flow chart of the logic of operation of the controller of the system of FIG. 13.

FIG. 14 shows a control logic for microprocessor 132 for voice messages corresponding to photographs mounted on album pages. An essentially identical logic, not shown, would be suitable for text messages with inputs coming from key pad 122. The process starts at a step 170, when a switch, not shown, is actuated when the album is opened. For play back of external messages, the process would start when switch 68 is pressed with the album closed. If the album is not open at a step 172, a step 174 enables external switch 68, display 70 and speaker 128 to allow a user to activate the system to play back a voice message or display a text message. If the album is open, a step 176 clears the input/output ports and sets the microprocessor to default values. Inputs from sensors 32 are received at a step 178, to indicate which album pages are visible to the user. At a step 180, microprocessor 132 confirms that the inputs from the sensors match a predetermined address. If there is no match, a step 182 indexes to a next predetermined address until a match is made. A step 184 then determines if switch 160 is set for manual or automatic operation. For automatic operation, a step 186 sequentially retrieves the appropriate left and right photo voice message or text message from memory 152 or memory 154 and sends the message to speaker 148 or the appropriate display. A step 188 then waits for the condition of the album to change. For manual operation, a step 190 determines if record switch 142 has been pressed. If not, after one of switches 156, 158 has been pressed, a step 192 retrieves the appropriate voice message or text message from memory and sends the message to the speaker or display. If record switch 142 has been pressed, a step 194 initiates recording after either of switches 138, 140 has been pressed. To record messages for external playback or display, external switch 68 would be pressed before switch 142 during a recording sequence.

The invention has been described in detail with particular reference to certain preferred embodiments thereof, but it will be understood that variations and modifications can be effected within the spirit and scope of the invention.

| PARTS LIST |
|---|
| 10 . . . album for photographic prints |
| 12 . . . front cover |
| 14 . . . back cover |
| 16 . . . binder or spine member |
| 18 . . . binder rings |
| 20 . . . holes |
| 22 . . . album pages |
| 24, 26 . . . photographs mounted on 22 |
| 28, 30 . . . permanent magnets on 22 |
| 32 . . . Hall effect sensors on 16 |
| 34 . . . support for each 32 |
| 36 . . . speaker |
| 38 . . . controller |
| 40 . . . wires from 32 to 38 |
| 42 . . . semi-cylindrical shell |
| 50 . . . album of present invention |
| 52 . . . hard shell front cover |
| 54 . . . hard shell back cover |
| 56 . . . binder or spine |
| 58, 60 . . . hinges between 56 & 50, 52 |
| 62 . . . peripheral wall of 52 |
| 64 . . . peripheral wall of 54 |
| 66 . . . external surface of 56 |

PARTS LIST

68 . . . switch
70 . . . text display panel
72 . . . grille for external speaker
74, 76 . . . recesses for opening 50
78 . . . elongated, partially cylindrical shell member
80, 82 . . . opposite ends of 78
84 . . . semi-cylindrical portion of 78
86, 88 . . . depending walls of 78
90, 92 . . . opposite longitudinal edges of 78
94 . . . album pages of present invention
96, 98 . . . opposed, hook-like portions of 94
100, 102 . . . end caps
104 . . . relief in 100, 102
105 . . . central portion of 100, 102
106 . . . open-ended slot in 78
108 . . . slidable latch member
110 . . . interior volume of 78
112, 114 . . . end sections of 78
116 . . . insert panel
118 . . . raised portion of 116
120 . . . control panel
122 . . . key pad
124 . . . batteries
126 . . . contact
128 . . . external speaker
130 . . . flexible cable
132 . . . microprocessor or controller
134 . . . microphone
136 . . . grille in 120 for 134
138 . . . left photo record switch
140 . . . right photo record switch
142 . . . record switch
144 . . . "record on" lamp
146 . . . semiconductor digital/analog storage device
148 . . . internal speaker
150 . . . grille on 120 for 148
152 . . . memory for sound messages
154 . . . memory for text messages
156 . . . left photo play back switch
158 . . . right photo play back switch
160 . . . manual/auto play back switch
170–194 . . . process steps

What is claimed is:

1. An album for photographic prints, comprising:

a front cover;

a back cover;

a binder member attached between said front and back covers;

an elongated, partially cylindrical shell member attached to said binder member, said shell member having opposite ends and opposed longitudinal edges, said longitudinal edges being attached to said binder member; and at least one album page movably attached to said shell member, said album page having opposed portions which extend around said opposite ends, whereby said album page can be moved circumferentially along said shell member from a first position near one of said covers to a second position near another of said covers.

2. An album according to claim 1, further comprising:

a sensing device to detect movement of said at least one album page and to produce a signal; and a system, responsive to said signal, for playing back sound messages associated with photographic prints carried by said at least one album page.

3. An album according to claim 2, wherein:

an interior volume is defined between said shell member and said binder member; and said sensing device includes a magnet carried on said at least one album page and a magnetic sensor located within said interior volume to detect movement of said at least one album page and to produce said signal.

4. An album according to claim 2, wherein:

said binder member comprises an external surface which is accessible when said album is closed and shelved like a book;

said system comprises a first speaker supported by said binder member for playing back sound messages through said external surface when said album is closed; and a switch is supported by said binder member and accessible at said external surface for activating said system to play back a sound message when said album is shelved like a book.

5. An album according to claim 4, further comprising a second speaker supported by one of said covers for playing back sound messages when said album is open.

6. An album according to claim 2, further comprising a pair of end caps installed at respective opposite ends of said shell member.

7. An album according to claim 6, wherein said end caps are relieved to guide movement of said opposed portions of said at least one album page.

8. An album according to claim 2, wherein said system also records said sound messages.

9. An album according to claim 2, wherein:

an interior volume is defined between said shell member and said binder member;

said system comprises at least one battery installed in said interior volume near one of said opposite ends; and an end cap is removably installed in said one opposite end for providing access to said battery.

10. An album according to claim 9, wherein said end cap is relieved to guide movement of one of said opposed portions of said at least one page.

11. An album according to claim 1, wherein:

said shell member comprises at one end an open-ended slot through which one of said opposed portions can be inserted; and a latch member is slidably mounted in said open-ended slot for blocking said slot to prevent removal of said one opposed portion through said slot.

12. An album according to claim 1, wherein:

an interior volume is defined between said shell member and said binder member; and said opposed portions are hooks having ends which are inserted into said interior volume.

13. An album according to claim 12, wherein said hooks are flexible to permit their being flexed past said opposite ends into said interior volume.

14. An album according to claim 1, wherein said shell member is made up of a plurality of sections which are axially aligned between said opposite ends.

15. An album according to claim 1, wherein said front and back covers are hinged to said binder member.

16. An album according to claim 1, further comprising:

a sensing device to detect movement of said at least one page album and to produce a signal; and a system, responsive to said signal, for displaying text messages associated with photographic prints carried by said at least one album page.

17. An album according to claim 16, wherein said system also records said text message.

18. An album according to claim 16, wherein:

said binder member comprises an external surface which is accessible when said album is closed and shelved like a book;

said system comprises a display supported by said binder member for displaying text messages at said external surface when said album is closed; and a switch is supported by said binder member and accessible at said external surface for activating said system to display a text message when said album is shelved like a book.

19. An album for photographic prints, comprising:

a front cover;

a back cover;

a binder member pivotably attached between said front and back covers;

at least one album page movably attached to said binder member between said covers;

a system for playing back sound messages associated with photographic prints carried by said at least one page;

wherein, said binder member comprises an external surface which is accessible when said album is closed and shelved like a book;

said system comprises a first speaker supported by said binder member for playing back sound messages through said external surface when said album is closed; and a switch is supported by said binder member and accessible at said external surface for activating said system to play back a sound message when said album is shelved like a book.

20. An album according to claim 19, further comprising a second speaker supported by one of said covers for playing back a sound message when said album is open.

21. An album according to claim 19, wherein said system also records said sound message.

22. An album for photographic prints, comprising:

a front cover;

a back cover;

a binder member pivotably attached between said front and back covers;

at least one album page movably attached to said binder member between said covers;

a system for displaying text messages associated with photographic prints carried by said at least one page;

wherein, said binder member comprises an external surface which is accessible when said album is closed and shelved like a book;

said system comprises a display supported by said binder member for displaying text messages at said external surface when said album is closed; and a switch is supported by said binder member and accessible at said external surface for activating said system to display a text message when said album is shelved like a book.

23. An album according to claim 22, further comprising a second display supported by one of said covers for displaying a text message when said album is open.

24. An album according to claim 22, wherein said system also records said text message.

25. An album according to claim 5, wherein said system switches between said first speaker and said second speaker when said album is opened or closed.

26. An album according to claim 20, wherein said system switches between said first speaker and said second speaker when said album is opened or closed.

* * * * *